United States Patent
Yoon et al.

(10) Patent No.: US 9,372,619 B2
(45) Date of Patent: Jun. 21, 2016

(54) DISPLAY APPARATUS AND METHOD THEREOF

(75) Inventors: Soo-yeoun Yoon, Seoul (KR); O-jae Kwon, Seoul (KR); Yoo-tai Kim, Yongin-si (KR); Bong-hyun Cho, Gwangju-si (KR); Gyung-hye Yang, Seoul (KR); Eun-hee Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 797 days.

(21) Appl. No.: 13/005,998

(22) Filed: Jan. 13, 2011

(65) Prior Publication Data

US 2011/0175855 A1 Jul. 21, 2011

(51) Int. Cl.
- G06F 3/033 (2013.01)
- G06F 3/0488 (2013.01)
- G06F 3/0354 (2013.01)

(52) U.S. Cl.
CPC ........ *G06F 3/04883* (2013.01); *G06F 3/03545* (2013.01)

(58) Field of Classification Search
CPC .......... G06F 3/03545; G06F 3/04883
USPC .......... 345/156–179, 582, 588; 715/203, 230, 715/233, 863; 382/131, 173
See application file for complete search history.

(56) References Cited

U.S. PATENT DOCUMENTS

| | | | | |
|---|---|---|---|---|
| 5,252,951 A * | 10/1993 | Tannenbaum et al. | ........ | 345/156 |
| 5,524,175 A * | 6/1996 | Sato et al. | ........ | 706/41 |
| 6,625,583 B1 * | 9/2003 | Silverman et al. | ........ | 705/36 R |
| 6,809,724 B1 * | 10/2004 | Shiraishi | ........ | G06F 1/163 345/157 |
| 7,009,594 B2 * | 3/2006 | Wang et al. | ........ | 345/156 |
| 7,693,842 B2 * | 4/2010 | Hinckley et al. | ........ | 707/770 |
| 7,970,259 B2 * | 6/2011 | Morotomi et al. | ........ | 386/278 |
| 8,142,275 B2 * | 3/2012 | Teranishi | ........ | 463/20 |
| 8,238,662 B2 * | 8/2012 | Banerjee et al. | ........ | 382/181 |
| 8,447,769 B1 * | 5/2013 | Paris et al. | ........ | 707/758 |
| 8,508,505 B2 * | 8/2013 | Shin et al. | ........ | 345/175 |
| 8,698,753 B2 * | 4/2014 | Jung et al. | ........ | 345/170 |
| 2002/0030689 A1 * | 3/2002 | Eichel et al. | ........ | 345/588 |
| 2002/0155892 A1 * | 10/2002 | Mishina et al. | ........ | 463/42 |
| 2003/0193483 A1 * | 10/2003 | Neville | ........ | 345/173 |
| 2004/0051704 A1 * | 3/2004 | Goulthorpe | ........ | G09F 19/22 345/204 |
| 2005/0146508 A1 * | 7/2005 | Kirkland et al. | ........ | 345/169 |
| 2005/0232600 A1 * | 10/2005 | Morotomi et al. | ........ | 386/95 |
| 2005/0237308 A1 * | 10/2005 | Autio et al. | ........ | 345/173 |
| 2005/0240943 A1 * | 10/2005 | Smith | ........ | G06F 9/465 719/328 |
| 2005/0289453 A1 * | 12/2005 | Segal et al. | ........ | 715/512 |
| 2007/0136772 A1 * | 6/2007 | Weaver et al. | ........ | 725/95 |

(Continued)

FOREIGN PATENT DOCUMENTS

KR 1020090016959 2/2009

OTHER PUBLICATIONS

Korean Office Action dated Dec. 14, 2015 issued in counterpart application No. 10-2010-0003756, 10 pages.

*Primary Examiner* — Prabodh M Dharia
(74) *Attorney, Agent, or Firm* — The Farrell Law Firm, P.C.

(57) ABSTRACT

A display apparatus is provided that includes a user interface unit which displays a content, a storage unit which stores a scribble pattern, and a control unit which, if a scribble is inputted according to the stored scribble pattern, sets a content area corresponding to a spot where the scribble is inputted and stores the set content area to the storage unit, making it possible to more efficiently manage the content.

18 Claims, 15 Drawing Sheets

(56) References Cited

U.S. PATENT DOCUMENTS

| | | | |
|---|---|---|---|
| 2007/0257915 A1* | 11/2007 | Kutaragi | G06F 3/011 345/427 |
| 2008/0250012 A1* | 10/2008 | Hinckley et al. | 707/5 |
| 2009/0022394 A1* | 1/2009 | Banerjee et al. | 382/164 |
| 2009/0135176 A1* | 5/2009 | Snoddy | G06Q 30/0247 345/419 |
| 2009/0138830 A1* | 5/2009 | Borgaonkar et al. | 715/863 |
| 2009/0219251 A1* | 9/2009 | Jung et al. | 345/170 |
| 2009/0284482 A1* | 11/2009 | Chin | 345/173 |
| 2009/0322279 A1* | 12/2009 | McBurney | 320/107 |
| 2010/0001963 A1* | 1/2010 | Doray | G06F 3/0317 345/173 |
| 2010/0013943 A1* | 1/2010 | Thorn | 348/222.1 |
| 2010/0045705 A1* | 2/2010 | Vertegaal et al. | 345/661 |
| 2010/0281402 A1* | 11/2010 | Staikos et al. | 715/760 |
| 2010/0306249 A1* | 12/2010 | Hill | G06F 17/30867 707/769 |
| 2011/0007029 A1* | 1/2011 | Ben-David | G06F 3/044 345/174 |
| 2011/0053641 A1* | 3/2011 | Lee | G06F 1/1626 455/556.1 |
| 2011/0070820 A1* | 3/2011 | Gao | H04W 4/06 455/3.06 |
| 2011/0130170 A1* | 6/2011 | Han et al. | 455/566 |
| 2011/0262010 A1* | 10/2011 | Thorn | 382/103 |
| 2012/0096345 A1* | 4/2012 | Ho et al. | 715/252 |
| 2012/0231441 A1* | 9/2012 | Parthasarathy et al. | 434/362 |
| 2013/0127748 A1* | 5/2013 | Vertegaal et al. | 345/173 |
| 2013/0147749 A1* | 6/2013 | Matthews et al. | 345/173 |
| 2014/0137234 A1* | 5/2014 | Chin | 726/19 |

* cited by examiner

A majority of Korean people are in favor of PyeongChang's third bid to host the 2018 Winter Olympics, said a recent survey.

More than 91 percent of 1,000 respondents of those 20 and older selected from across the country said they are in support of PyeongChang, while 93 percent of 700 residents from PyeongChang and its suburb area nodded for the city.

The survey was conducted via telephone interview by PyeongChang Olympic bid committee in cooperation with the survey firm TNS Korea from Dec. 10 to 11.

On the benefits expected from hosting the 2018 Olympics, 46.9 percent said it would enhance the brand value of Korea, following 30.2 percent of respondents citing the regional development of the country.

More than 50 percent of local residents, however, said they expect to see development in local economy, while 23.4 percent cited the improved brand value of Korea.

| Font Size | | | | | ✕ |
|---|---|---|---|---|---|
| icon | ☑ icon | icon | icon | icon | |
| Size 1 | Size 2 | Size 3 | Size 4 | Size 5 | |

FIG. 2B

A majority of Korean people are in favor of PyeongChang's third bid to host the 2018 Winter Olympics, said a recent survey.

More than 91 percent of 1,000 respondents of those 20 and older selected from across the country said they are in support of PyeongChang, while 93 percent of 700 residents from PyeongChang and its suburb area nodded for the city.

The survey was conducted via telephone interview by PyeongChang Olympic bid committee in cooperation with the survey firm TNS Korea from Dec. 1 to 11.

On the benefits expected from hosting the 2018 Olympics, 46.9 percent said it would enhance the brand value of Korea, following 30.2 percent of respondents citing the regional development of the country.

More than 50 percent of local residents, however, said they expect to see development in local economy, while 23.4 percent cited the improved brand value of Korea.

"First of all, I appreciate the high level of public support," Jang Jai-ryong, the Secretary General of the PyeongChang 2018 Bid Committee said in a statement.

FIG. 2C

A majority of Korean people are in favor of PyeongChang's third bid to host the 2018 Winter Olympics, said a recent survey.
More than 91 percent of 1,000 respondents of those 20 and older selected from across the country said they are in support of PyeongChang, while 93 percent of 700 residents from PyeongChang and its suburb area nodded for the city.
The survey was conducted via telephone interview by PyeongChang Olympic bid committee in cooperation with the survey firm TNS Korea from Dec. 10 to 11.
On the benefits expected from hosting the 2018 Olympics, 46.9 percent said it would enhance the brand (value of Korea,) following 30.2 percent of respondents citing the regional development of the country.
More than 50 percent of local residents, however, said they expect to see development in local economy,

| Font Size | | | | | ✕ |
|---|---|---|---|---|---|
| icon | ☑ icon [S] | icon | icon | icon | |
| Size 1 | Size 2 | Size 3 | Size 4 | Size 5 | |

[S] This font is available to scribble and see previous scribbles.

FIG. 3B

A majority of Korean people are in favor of PyeongChang's third bid to host the 2018 Winter Olympics, said a recent survey.

More than 91 percent of 1,000 respondents of those 20 and older selected from across the country said they are in support of PyeongChang, while 93 percent of 700 residents from PyeongChang and its suburb area nodded for the city.

The survey was conducted via telephone interview by PyeongChang Olympic bid committee in cooperation with the survey firm TNS Korea from Dec. 10 to 11.

On the benefits expected from hosting the 2018 Olympics, 46.9 percent said it would enhance the brand <u>value of Korea,</u> following 30.2 percent of respondents citing the regional development of the country.

More than 50 percent of local residents, however, said they expect to see development in local economy, while 23.4 percent cited the improved brand value of Korea.

"First of all, I appreciate the high level of public support," Jang Jai-ryong, the Secretary General of the PyeongChang 2018 Bid Committee said in a statement.

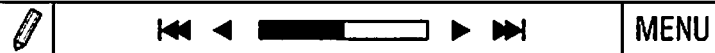

MENU

FIG. 5A

A majority of Korean people are in favor of PyeongChang's third bid to host the 2018 Winter Olympics, said a recent survey.
More than 91 percent of 1,000 respondents of those 20 and older selected from across the country said they are in support of PyeongChang, while 93 percent of 700 residents from PyeongChang and its suburb area nodded for the city.
The survey was conducted via telephone interview by PyeongChang Olympic bid committee in cooperation with the survey firm TNS Korea from Dec. 10 to 11.
On the benefits expected from hosting the 2018 Olympics, 46.9 percent said it would enhance the brand value of Korea, following 30.2 percent of respondents citing the regional development of the country.
More than 50 percent of local residents, however, said they expect to see development in local economy, while 23.4 percent cited the improved brand value of Korea.
"First of all, I appreciate the high level of public support," Jang Jai-ryong, the Secretary General of the PyeongChang 2018 Bid Committee said in a statement.

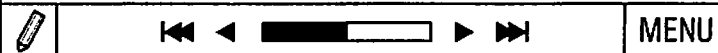

MENU

FIG. 6A

On the benefits expected from hosting the 2018 Olympics, 46.9 percent said it would enhance the brand value of Korea, following 30.2 percent of respondents citing the regional development of the country.

FIG. 6B

⚛On the benefits expected from hosting the 2018 Olympics, 46.9 percent said it would enhance the brand value of Korea, following 30.2 percent of respondents citing the regional development of the country.

FIG. 6C

610 —— On the benefits expected from hosting the 2018 Olympics, 46.9 percent said it would enhance the brand value of Korea, following 30.2 percent of respondents citing the regional development of the country.
620 ——

FIG. 6D

On the benefits expected from hosting the 2018 Olympics, 46.9 percent said it would enhance the brand value of Korea, following 30.2 percent of respondents citing the regional development of the country.

FIG. 6E

On the benefits expected from hosting the 2018 Olympics, 46.9 percent said it would enhance the brand value of Korea, following 30.2 percent of respondents citing the regional development of the country.

DISPLAY APPARATUS AND METHOD THEREOF

PRIORITY

This application claims priority under 35 U.S.C. §119(a) to Korean Patent Application No. 10-2010-0003756, filed on Jan. 15, 2010, in the Korean Intellectual Property Office, the content of which is incorporated herein by reference.

BACKGROUND OF THE INVENTION

1. Field of the Invention

The present invention relates generally to a display apparatus and a method thereof, and more particularly to a display apparatus for providing scribble function and a display method thereof.

2. Description of the Related Art

Multimedia devices are evolving to provide various and different content. Among these, an electronic book, or e-book, provides a user with an Electronic Paper Display (EPD) function of book content via a multimedia device.

The e-book content generally refers to digital books in which information including text or images are recorded on an electronic medium and delivered to the user to be read, similar to printed books. E-books are advantageous to users due to lower cost than printed books, to allow selective access to only a desired portion of the e-book, or among other reasons. E-books are also advantageous to publishers due to reduced publishing and distribution costs, ease of update, and other factors.

An e-book apparatus refers to a device that displays e-book content on a screen thereof. Accordingly, a user of e-book apparatus can easily download e-book content and can also use different various functions of the e-book.

A touch screen device has also become available, enabling users to scribble text and/or drawings thereon using a stylus or fingertip. Accordingly, a method is needed to apply such scribbling function to e-books.

SUMMARY OF THE INVENTION

The present invention has been made to overcome the problems mentioned above. Accordingly, an aspect of the present invention is to provide a display apparatus capable of providing a scribble function using a scribble font, and a display method thereof.

In an embodiment, a display apparatus is provided that includes a user interface unit which displays a content, a storage unit which stores at least one scribble pattern, and a control unit which, if a scribble is inputted according to the stored scribble pattern, sets a content area corresponding to a spot where the scribble is inputted and stores the set content area to the storage unit.

The control unit sets the content area with reference to the spot where the scribble is inputted, in a direction corresponding to a type of the scribble pattern corresponding to a preset size.

The control unit sets the content from an uppermost spot to a lowermost spot to be the content area.

If two or more scribble patterns are inputted within a preset range or at a preset time interval, the control unit sets the content area according to the two or more scribble patterns altogether.

The control unit determines the scribble corresponds to the stored scribble pattern only if the content exists in a predetermined range from the spot where the scribble is inputted.

The control unit categorizes the set content area under respective scribble patterns and store the set content area categories at the storage unit.

If a command directing to check the content of the spot corresponding to the scribble pattern is inputted, the control unit controls reading of the content of the area corresponding to the scribble pattern from the storage unit and display in a list form.

The control unit stores an original file of the content and a scribble file separately at the storage unit.

In another embodiment, a display method is provided that includes displaying a content and, if a scribble is inputted over the content according to a previously-stored scribble pattern, setting a content area corresponding to a spot where the scribble is inputted and storing the set content area.

The setting may further include setting the content area with reference to the spot where the scribble is inputted, in a direction corresponding to a type of the scribble pattern and corresponding to a preset size.

The setting may include setting the content from an uppermost spot to a lowermost spot to be the content area.

If two or more scribble patterns are inputted within a preset range or at preset time interval, the setting may include setting the content area according to the two or more scribble patterns altogether.

The setting may include determining the scribble corresponds to the stored scribble pattern only if the content exists in a predetermined range from the spot where the scribble is inputted.

The display method may additionally include categorizing the set content area under respective scribble patterns and storing the set content area categories.

If a command directing a check of the content of the spot corresponding to the scribble pattern is inputted, the display method may additionally include reading the content of the area corresponding to the scribble pattern and displaying the read information in a list form.

The display method may additionally include storing an original file of the content and a scribble file separately at the storage unit.

As a result, the user is able to efficiently manage the contents including texts on the e-book apparatus, or the like by applying personalized touch to the content.

BRIEF DESCRIPTION OF THE DRAWINGS

The above and other aspects, features and advantages of the present invention will be more apparent from the following detailed description when taken in conjunction with the accompanying drawings, in which:

FIGS. 2A to 2C illustrate a method for setting a scribble font according to an embodiment of the present invention;

FIGS. 3A and 3B explain a list of scribbles according to another embodiment of the present invention;

FIGS. 5A and 5B provide examples of utilizing scribble patterns registered as illustrated in FIG. 4;

FIGS. 6A to 6E provide examples of setting content area to correspond to the scribble patterns registered in FIG. 4.

DETAILED DESCRIPTION OF EMBODIMENTS OF THE PRESENT INVENTION

Figure 1:
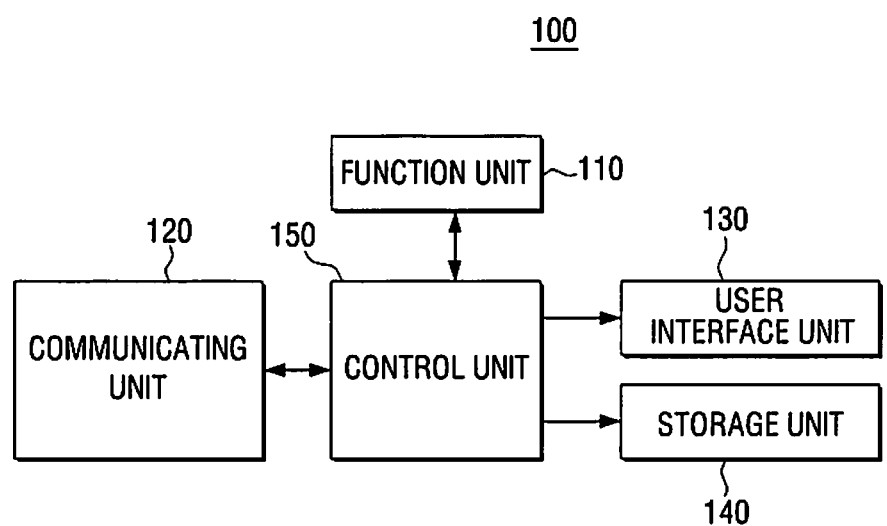
FIG. 1 is a block diagram of a display apparatus according to an embodiment of the present invention.

Embodiments of the present invention are described in detail with reference to the accompanying drawings.

In the following description, the same or similar reference numerals may be used for the same or similar elements when illustrated in different drawings. Detailed descriptions of constructions or processes known in the art may be omitted to avoid obscuring the subject matter of the present invention.

FIG. 1 is a schematic block diagram of a display apparatus according to an embodiment of the present invention. Referring to FIG. 1, the display apparatus 100 includes a function unit 110, a communicating unit 120, a user interface unit 130, a storage unit 140 and a control unit 150.

The display apparatus 100 herein may be implemented as a portable electronic medium such as a mobile phone, Portable Digital Assistant (PDA), Personal Mobile Phone (PMP) with e-book function that also records texts or images in digital form input by a user.

As used herein, e-book collectively refers to digital books which record user input, that displays published book and similar content, and that uses digital data storage for an electronic recording and display thereof, thereby enabling a user to read and view the recorded content using a computer or a mobile terminal via a wired or wireless information communication network.

For convenience of explanation, the display apparatus 100 is also referred to as an e-book apparatus 100.

The e-book apparatus 100 provides a scribble function that enables a user to add text and/or drawings to electronic content provided by the e-book apparatus 100 using a pen, stylus, fingertip, or the like.

A fingertip or stylus pen may be provided to enable a user to use the scribble function of the e-book apparatus 100. As used herein, stylus pen or PDA pen refers to one of computer input devices used to write a text or to draw a line.

The function unit 110 performs conventional e-book roles, including for example, playback of the content, particularly e-book content. Additionally, the function unit 110 may carry out a variety of other functions provided by the e-book apparatus 100, including setting fonts, indexing bookmark, inserting bookmarks, inserting empty pages, scribbling/deleting, adding/deleting memos, searching words, word translation/replacement/insertion, dictionary, and the like.

The communicating unit 120 may be communicably connected to an external device (not illustrated) via mobile communication network or Internet. By way of example, the communicating unit 120 may download e-book content from the external device.

The user interface unit 130 receives a user's manipulation and interprets that manipulation as a user command. To be specific, the user interface 130 receives the user's various manipulations corresponding to the user commands regarding various items displayed on a screen. The user interface unit 130 may be implemented as a touch screen, a button, a mouse, or a touchpad.

Additionally, the user interface unit 130 displays various screens to provide the function of the e-book apparatus 100, preferably by displaying specific e-book content on the screen.

Additionally, depending on user need, a plurality of displays may be provided to display different e-book contents thereon.

The storage unit 140 stores therein programs and applications to carry out the functions of the e-book apparatus 100. Additionally, the storage unit 140 may store therein additional information related to the e-book content and other content. Such additional information includes memo information regarding a specific content and previously-searched information. The memo information includes user's memo that the user inputted regarding a specific content of a specific item. The dictionary function refers to the results obtained by looking up language dictionary or encyclopedia regarding a specific item.

The storage unit 140 may particularly store scribble patterns previously inputted by the user. As used herein, scribble patterns refer to one or a series of shapes inputted by the user, and includes various lines such as straight lines, curved lines, dashed lines, and the like, as well as geometries including circles, squares, triangles, stars and asterisks), numerals and text.

As necessary, the scribble patterns may be previously set and stored by a manufacturer during production of the e-book.

The storage unit 140 preferably also stores therein information of settings of scribble fonts, including the information regarding font sizes available for scribbling of the scribble patterns. By way of example, one text size may be provided for the e-book content provided via the user interface unit 130 and another text size may be set as the font size available for scribbling.

A predetermined font for scribbling may be set by default for the entire contents provided by the e-book apparatus 100. Alternatively, fonts may be set and stored individually for respective content types.

The control unit 150 controls the overall operation of the e-book apparatus 100 according to user manipulations inputted through the user interface 130.

Particularly, if a user scribble is inputted in regard to specific content, the control unit 150 may determine whether the inputted scribble corresponds to a scribble pattern that is stored in the storage unit 140.

That is, the control unit 150 determines whether the inputted scribble corresponds to a previously-stored scribble pattern based on similarity between the previously-stored scribble pattern and the newly inputted scribble. By way of example, if the previously-stored scribble pattern is a 'circle' shape and the newly inputted scribble does not perfectly match but has a predetermined similarity to the circle pattern, the control unit 150 may determine the newly inputted scribble to correspond to the previously-stored circle pattern.

The control unit 150 may also determine that the inputted scribble corresponds to the previously-stored scribble pattern by determining whether the scribble is inputted at predetermined time intervals. By way of example, if the previously-stored scribble pattern is a 'double circles' pattern, the control unit 150 may determine that the newly input scribble does not correspond to the previously-stored scribble pattern if additional, i.e. second circle of the double circle, is inputted after a predetermined time has elapsed from the input of a first circle of the double circle.

Additionally, the control unit 150 may determine whether the newly input scribble corresponds to the previously-stored pattern if the scribble is inputted in the same order as the previously-stored scribble patterns. That is, if the 'circle' pattern has been previously-stored in clockwise direction, the control unit 150 perceives only the scribble inputted in clockwise direction to correspond to the previously-stored 'circle' pattern. Accordingly, the control unit 150 may determine that a circle that is inputted in a counterclockwise direction does not correspond to a previously-stored scribble pattern that was inputted in a clockwise direction.

Additionally, the control unit 150 may perceive that the newly inputted scribble pattern corresponds to the previously-stored scribble pattern only when the content exists within a predetermined range of the newly inputted scribble pattern. That is, if a new scribble is inputted in the same pattern as the previously-stored pattern but is inputted into an empty area where no content is displayed, the control unit 150 may determine that the newly inputted scribble does not correspond to the previously-stored pattern.

If a scribble is inputted and the input scribble corresponds to the previously-stored pattern, the control unit 150 sets a content area corresponding to a spot of scribble input and stores information regarding the settings or corresponding content area.

Herein, the control unit 150 may set the content area in a direction corresponding to the pattern of the inputted scribble and in a predetermined size. To be specific, the control unit 150 may set a content area of the inputted scribble pattern from an uppermost spot to a lowermost spot.

By way of example, if the input scribble pattern is an 'underline' pattern, the content above the 'underline' pattern may be set to be the corresponding content area. If the input scribble pattern is a 'looped curved' pattern, the content enclosed by the looped curve pattern may be set to be the corresponding content area. If the inputted scribble pattern is a 'star' pattern, the content below the 'star' pattern may be set to be the corresponding content area.

Additionally, if a scribble pattern such as the star pattern or the asterisk pattern is inputted in front of a sentence or paragraph, the corresponding sentence or paragraph may be set to be the corresponding content area.

Additionally, if a scribble pattern such as the star pattern or the asterisk pattern is inputted in the middle of a sentence or in front of a word, the referenced word may be set to be the corresponding content area.

Additionally, if a pattern such as the star pattern is inputted over a plurality of lines, the content from the uppermost spot to the lowermost spot may be set to be the corresponding content area.

Additionally, if two or more scribble patterns are inputted within a predetermined range or at predetermined time interval, a content area may be set by linking the two or more scribble patterns together.

By way of example, if scribble patterns of the star pattern and the underline pattern, assuming that both of the two patterns are the previously-stored scribble patterns, are inputted with respect to one word, the two patterns, i.e. the star pattern and the underline pattern, may be perceived as one single scribble pattern.

Additionally, the control unit 150 may distinguish the scribble patterns inputted by the user's scribbling from marking patterns inputted by use of a menu. That is, the control unit 150 may distinguish the 'underline' pattern as a scribble pattern inputted by use of a fingertip or a stylus pen, from another 'underline' pattern which is inputted by use of an 'underline menu'.

Additionally, if determining an attempted input of a scribble on the user interface unit 130 with respect to the content currently displayed, the control unit 150 may determine if the current display font is a previously-set scribble font, using the information of settings regarding the fonts for scribbles stored at the storage unit 140.

The control unit 150 may react to the attempt for scribble and thus add a scribble to the content, if the scribble attempted to be inputted is in a font corresponding to the previously-set font for scribble. In this case, the control unit 150 may display the scribble in an adjusted transparency, a color, or the like so that the newly inputted scribble does not cover or obscure the content.

Additionally, the control unit 150 may ignore the attempt for scribble input if the scribble currently is not in the front for input of scribble. In this case, the control unit 150 may display a message through the user interface unit 130, notifying that an addition or input of scribble is not allowed in the current font.

Additionally, the control unit 150 may display a message through the user interface unit 130 to inquire whether to change the font for scribble input. In this case, the control unit 150 may change the information of settings stored in the storage unit 140, if a command is inputted, directing to change the current font to the scribble font.

If the information of settings stored in the storage unit 140 changes, the scribbles inputted in the previous scribble font disappear from the corresponding content, making it possible to input a scribble in a newly set scribble font over the original content. Meanwhile, if the current display font is changed back to the previous scribble font, the scribbles that previously disappeared from the content may again be displayed.

Additionally, if the information of settings regarding the scribbles is not stored in the storage unit 140, the control unit 150 may set the font of the scribble which is currently attempted to be inputted as the scribble font, and store the information of settings regarding the current font at the storage unit 140.

Meanwhile, if the current font is changed from the scribble font to another font, the control unit 150 may cause the scribbles inputted in the scribble font to disappear from the corresponding content.

Additionally, the control unit 150 may cause the storage unit 140 to separately store the original file of the content and a scribble file in which scribbles are added to the content.

Alternatively, the control unit 150 may cause the storage unit 140 to separately store the original file of the content and a scribble file including only the inputted scribbles without the original content. The control unit 150 may automatically register the information about the scribble file regarding the corresponding content as metadata, for matching of the corresponding content and the scribble file when needed.

Additionally, the control unit 150 may cause the user interface unit 130 to generate a list of scribbles inputted with respect to the displayed content, and display the generated list.

The list of scribbles may include only the list of contents to which scribbles are inputted, or additionally may include the contents for which other functions such as memo-taking and underlining are carried out, as explained in greater detail below.

Additionally, the control unit 150 may determine that an attempt to input scribble is being made if a touch of the stylus pen or other input device is detected with respect to a portion of the touch screen where the content is displayed.

Additionally, the control unit 150 may cause the content with the scribble to be displayed in a format that is different from the original content. By way of example, the portion of the content where the scribble is inputted may be displayed in highlighting, different color, boldface, reversed color, or enlargement to be distinguished from the original content.

If the text of the portion of the content where the scribbles are inputted is displayed in enlargement, the control unit 150 may allow the user to set/change the ratio using a separately displayed magnifying glass icon. Additionally, the control unit 150 allows the user to set/change information regarding the display settings in the similar manner.

Meanwhile, the storage unit 140 may store at least one previously-inputted scribble pattern. Herein, the user may utilize the scribble patterns to input, store or use a specific pattern as his personal marker. By way of example, the user may input and store a star pattern ("☆") and utilize this star pattern as a marker to manage the content by scribble function. Accordingly, the user is able to manage a plurality of contents efficiently by applying personalized touch to the content.

In this case, if a scribble pattern corresponding to the scribble pattern previously-stored at the storage unit 140 is added to the content, the control unit 150 may store to the storage unit 140 the content of the area where the scribble pattern is added.

Additionally, if a command directing a check of content of the scribbled spot (i.e., the spot where the scribble pattern is added) is inputted, the control unit 150 allow the content of the scribbled spot to be read from the storage unit 140 and displayed in a list form. In this case, the generated may include a list of contents with added scribble patterns, a list of a plurality of areas of one content, such as pages, sentences and words, to which the scribble patterns are added.

Additionally, the e-book apparatus 100 may provide an underlining function for underlining a selected area when a menu is selected and a block is set with respect to the selected area; a highlighting function for highlighting a selected area when a highlighting menu is selected, with a color for highlighting being selected from a window which pops up upon selecting of the highlighting menu, and a block is set for the selected area; an eraser function for erasing a selected area of the page when an eraser menu is selected and the selected area is clicked or selected; a memo function for inputting a memo via a memo input pop-up window; or a dictionary function for providing a result of a dictionary looking up from a language dictionary, encyclopedia and other references with respect to a specific text. Additionally, the above functions may be provided as various combinations with the scribble function. By way of example, the scribble function and the eraser function, or the scribble function and the dictionary function may be applied in combination.

FIGS. 2A to 2C are views provided to explain a method for setting a scribble font according to an embodiment of the present invention. Referring to FIG. 2A, it is assumed that the user opens e-book content on the e-book apparatus 100 and the current display font of the e-book content is set to a size "2".

Referring to FIG. 2B, if the user attempts to input a scribble using the fingertip or stylus pen as described above, in the absence of previously-set scribble font, the current display font, i.e. size "2", is set as the scribble font.

Alternatively, in the presence of the previously-set scribble font, a message may be displayed informing that the current display font is not the scribble font and/or a message may be displayed inquiring as to whether to change the scribble font.

Referring to FIG. 2C, if the user, after attempting to input a scribble in the scribble font, wishes to change the display font, a predetermined icon (▣) may appear with an explanation at the scribble font indicating that the referenced font currently is the scribble font. Additionally, a message inquiring whether to change the scribble font may be displayed.

Figure 3A:
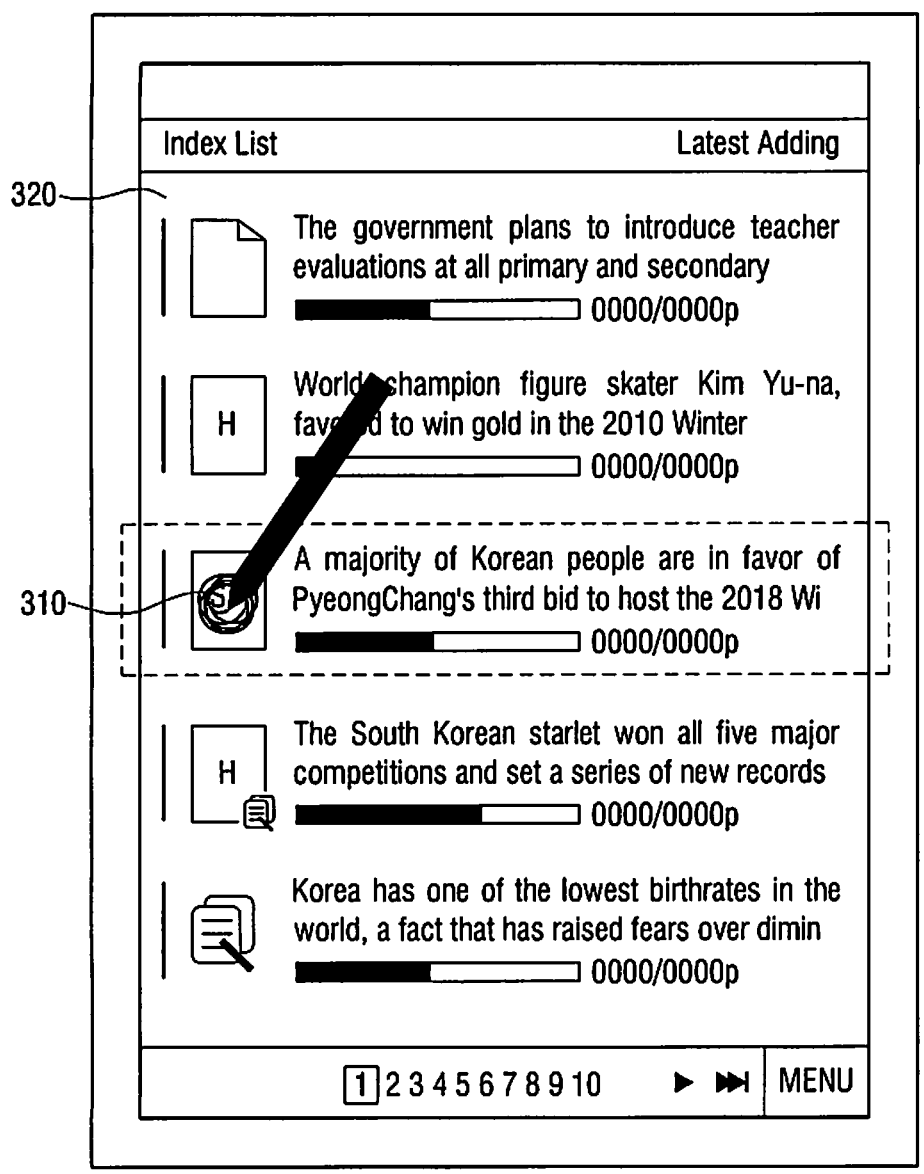

FIGS. 3A and 3B are views provided to explain a list of scribbles according to another embodiment of the present invention. Referring to FIG. 3A, a list of scribbled contents, i.e. listing the contents to which scribbles are added, may be provided.

The list of scribbled contents may include a list of different scribbled contents.

Alternatively, the list of scribbled contents may include a list of scribbled pages, i.e. pages to which scribbles are added, of the same content.

Alternatively, the list of scribbled contents may include a list of scribbled portions, i.e. portions to which scribbles are added, of the same page.

Additionally, as illustrated in FIG. 3A, the list of scribbled contents may include a list of contents, pages, or sentences for which other annotation functions such as memo, underlining, or the like are inputted.

Meanwhile, referring to FIG. 3A, if a specific scribble (310) is selected from the displayed list of scribbles (320), as illustrated in FIG. 3B, the screen may change to the corresponding content page or area. In this case, the scribble file may be overlain on the screen using the registered metadata.

Figure 4:
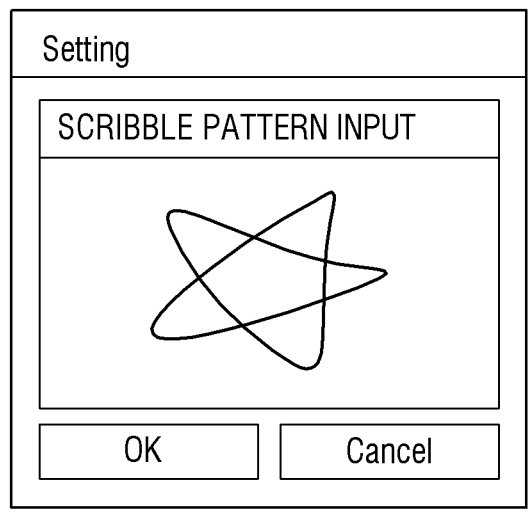
FIG. 4 illustrates a method for registering scribbling patterns according to another embodiment of the present invention.

FIG. 4 is a view provided to explain a method for registering a scribble pattern according to another embodiment of the present invention. Referring to FIG. 4, the user may input and register a desired scribble pattern using a scribble pattern registration menu. The registered scribble pattern may be utilized as a user's personal markers for the management of the contents.

By way of example, the user may personalize the scribble patterns and use the personalized patterns to manage the content.

Figure 5B:
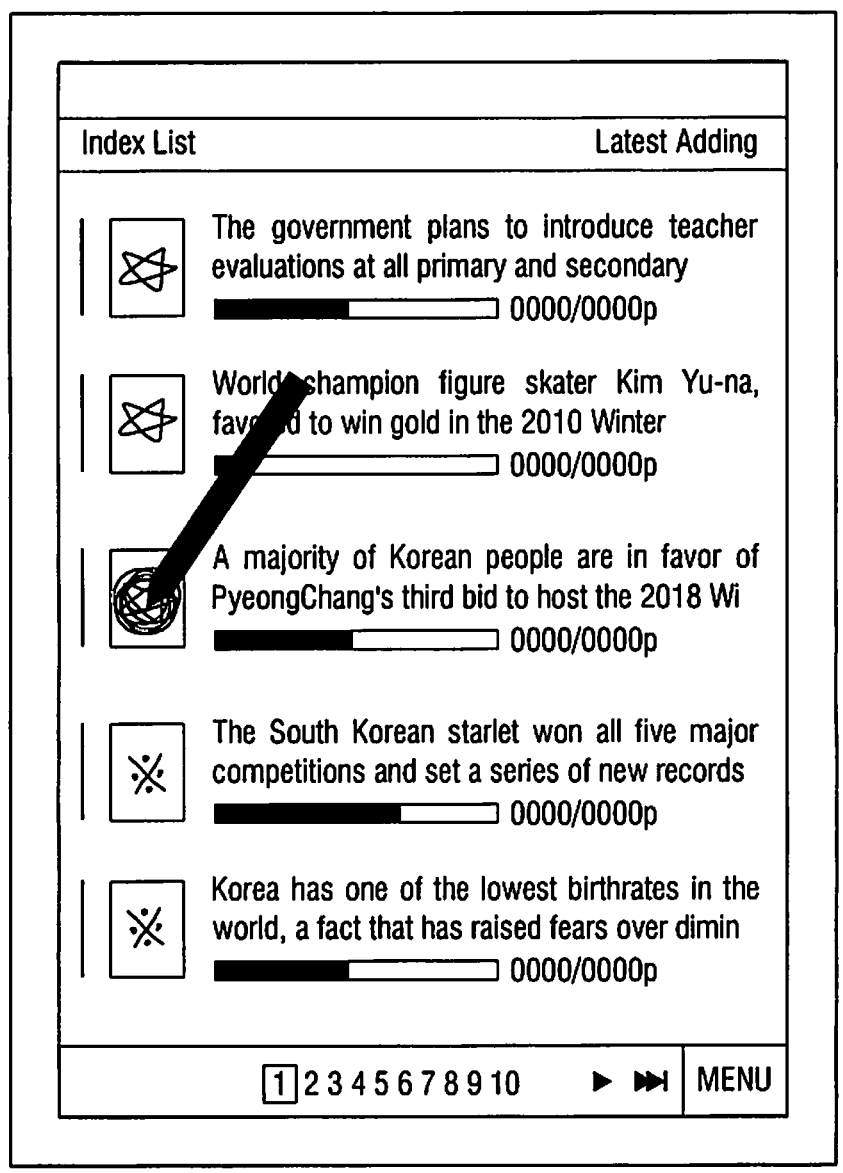

FIGS. 5A and 5B are views provided to explain the scribble pattern registered as illustrated in FIG. 4 according to various examples of an embodiment of the present invention. Referring to FIG. 5A, if the user uses the scribble pattern registered in FIG. 4 as a scribble regarding content, as illustrated in FIG. 5B, a list of scribbles is generated under categories of registered scribble patterns and managed.

By way of example, only a list of contents under a category of scribble patterns as desired by the user may be displayed. Alternatively, a list of contents under all categories of previously-registered scribble patterns may be displayed. Alternatively, a list of contents under categories of previously-registered scribble patterns may be displayed along with a list of contents under categories of other forms of annotation patterns, such as a memo.

FIGS. 6A to 6E are provided to explain setting of a content area corresponding to the scribble pattern registered as illustrated in FIG. 4 according to various examples of an embodiment of the present invention.

As shown in FIG. 6A, if a previously-stored scribble 'star' pattern is inputted in proximity to a word of a sentence, the referenced word 'value', a phrase including 'value', i.e. value of Korea, or a sentence or paragraph containing 'value', i.e. 'On the . . . country', may be set as the corresponding content area.

As shown in FIG. 6B, if the previously-stored 'star' scribble pattern is inputted in front of a paragraph, the entire paragraph may be set to be the corresponding content area according to the previously-set information.

As shown in FIG. 6C, if the previously-stored 'star' scribble pattern is inputted over a plurality of lines, the content from the uppermost spot (610) to the lowermost spot (620) may be set as the corresponding content area.

As shown in FIG. 6D, if the previously-stored 'underline' scribble pattern is inputted over the content, the content above the 'underline', i.e. "value of Korea", may be set as the corresponding content area according to preset information.

If the previously-stored 'looped curve' scribble pattern is inputted, the content enclosed by the looped curve may be set as the corresponding content area. Additionally, as shown in FIG. 6E, if the previously-stored 'star' and 'looped curve' scribble patterns are inputted concurrently, the two patterns are perceived as one scribble pattern and the corresponding content area may be set accordingly.

Figure 7:
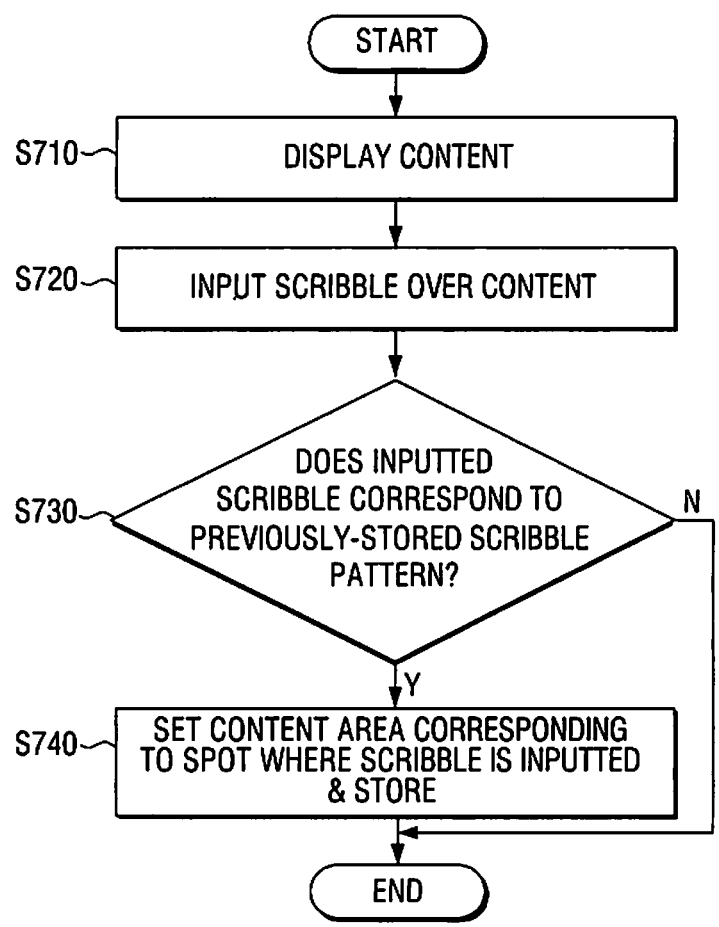
FIG. 7 is a flowchart explaining a display method according to an embodiment of the present invention.

FIG. 7 is a flowchart provided to explain a display method according to an embodiment of the present invention. Referring to FIG. 7, content is displayed at step 710, scribble is inputted over the content at step 720, and a determination is made of whether the inputted scribble corresponds to previously-stored scribble pattern at step 730.

The determination of whether the inputted scribble corresponds to the previously-stored scribble pattern may be based on similarity between the previously-stored scribble pattern and the newly inputted scribble.

That is, the newly inputted scribbles may be determined to correspond to the previously-stored scribble patterns only when the scribbles are inputted in a same order of input as previously-stored scribble patterns.

Additionally, the scribbles may be determined to correspond to previously-stored scribble patterns only when the scribbles are inputted at preset time intervals, as described above.

Additionally, the scribbles may be determined to correspond to previously-stored scribble patterns only when the content exists within a predetermined range of the inputted scribbles.

As an example, whether the scribbles correspond to the previously-stored scribble patterns may be based on a consideration of previously-stored patterns and a size of the inputted scribbles.

At step 730, if it is determined that the scribbles inputted at steps 720 correspond to the previously-stored scribble patterns, a content area corresponding to the scribbled spot, i.e. a spot where scribble is added, is set and stored in step 740.

In this case, the content area may be set in a corresponding direction to the scribble pattern type corresponding to a preset size, with reference to the scribbled spot.

That is, the content from the uppermost spot to the lowermost spot may be set to be the corresponding content area.

Additionally, if two or more scribble patterns are inputted within a predetermined range or at predetermined time interval, a content area may be set by linking the two or more scribble patterns together, as described above.

Meanwhile, the original file of the content and a scribble file may be stored separately. The scribble file may be a file of the original file to which scribbles are added, or only the scribble file, i.e. without the original file.

Additionally, a list of scribbled contents, i.e. the respective contents to which scribbles are added, may be generated and displayed according to user commands. The list of scribbled contents herein may include a list of different contents to which scribbles are added.

Alternatively, the list of scribbled contents may include a list of scribbled pages or portions, i.e. pages or portions to which scribbles are added, of the same content.

Additionally, as illustrated in and discussed above in regard to FIG. 3A, the list of scribbled contents may include a list of contents, pages, or sentences for which other annotation functions such as memo, underlining, or the like are inputted.

Additionally, upon input of a command directing to check the content of the scribbled spot, i.e. spot to which scribble pattern is added, the content of the scribbled spot is read and displayed in a list form.

As a result, the user is able to efficiently manage the contents including texts on the e-book apparatus by applying personalized touch to the content.

In the embodiments explained above, the e-book apparatus is described as one example of display apparatus for the illustrative purpose only. Accordingly, the technical concept of the present invention is not limited to the e-book apparatus only, and applicable to other forms of devices which are capable of providing scribble function with respect to the content including text. By way of example, the display apparatus may include PMP, MP3, mobile phone, laptop computer, or PDA as well as the e-book apparatus.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A display apparatus comprising:
a user interface unit for displaying a content on a screen and detecting a user input over a displayed content;
a storage unit for storing a user input pattern and information with respect to an area corresponding to the user input pattern; and
a control unit for determining whether the detected user input substantially matches the stored user input pattern and upon determination that the detected user input substantially matches the stored user input pattern, selecting an area corresponding to the user input pattern based on the information stored in the storage unit and storing a content on the selected area in the storage unit,
wherein each of the information with respect to each area corresponding to the user input pattern has different size information according to a type of the user input pattern and a location where the user input is inputted.

2. The display apparatus of claim 1, wherein the control unit selects the area in a direction corresponding to a type of the stored user input pattern and corresponding to a preset size of the stored user input pattern.

3. The display apparatus of claim 1, wherein the control unit selects the area to be from an uppermost area to a lowermost area.

4. The display apparatus of claim 1, wherein, if it is determined that two or more of the detected user input match two or more of the stored user input pattern, and the two or more of the detected user input are inputted within a preset range, the control unit selects the area according to the two or more of the stored user input pattern altogether.

5. The display apparatus of claim 1, wherein, if it is determined that two or more of the detected user input match two or more of the stored user input pattern, and the two or more of the detected user input are inputted within at a preset time interval, the control unit selects the area according to the two or more of the stored user input pattern altogether.

6. The display apparatus of claim 1, wherein the control unit determines that the detected user input corresponds to the stored user input pattern only if the displayed content exists within a predetermined range from where the detected user input is inputted.

7. The display apparatus of claim 1, wherein the control unit categorizes the selected area under the respective stored user input pattern and stores the categories at the storage unit.

8. The display apparatus of claim 1, wherein, if a command directing to check information corresponding to the stored user input pattern is inputted, the control unit controls so that the content displayed in the selected area is read from the storage unit and displayed in a list form.

9. The display apparatus of claim 1, wherein the control unit separately stores an original file of the displayed content and a user input pattern file of the content displayed in the selected area in the storage unit.

10. method for selecting an area of a content, the method comprising:
- displaying the content on a screen;
- detecting a user input over the displayed content;
- determining whether the detected user input substantially matches a stored user input pattern; and
- if the detected user input is determined to substantially match the stored user input pattern, selecting an area corresponding to the user input pattern based on pre-stored information with respect to an area corresponding to the user input pattern and storing a content on the selected area,
- wherein each of the information with respect each area corresponding to the user input pattern has different size information according to a type of the user input pattern and a location where the user input is inputted.

11. The method of claim 10, wherein selecting the area comprises selecting the area in a direction corresponding to a type of the stored user input pattern and corresponding to a preset size of the stored user input pattern.

12. The method of claim 10, wherein selecting the area comprises selecting the area to be from an uppermost area to a lowermost area.

13. The method of claim 10, wherein, if it is determined that two or more of the detected user input match two or more of the stored user input pattern, and the two or more of the detected user input are inputted within a preset range, determining the area comprises selecting the area according to the two or more of the stored user input pattern altogether.

14. The method of claim 10, wherein, if it is determined that two or more of the detected user input match two or more of the stored user input pattern, and the two or more of the detected user input are inputted at a preset time interval, selecting the area comprises selecting the area according to the two or more of the stored user input pattern altogether.

15. The method of claim 10, wherein the detected user input is determined to correspond to the stored user input pattern only if the displayed content exists in a predetermined range from where the detected user input is inputted.

16. The method of claim 10, further comprising categorizing the selected area under the respective stored user input pattern and storing the categories.

17. The method of claim 10, wherein, if a command directing to check information corresponding to the stored user input pattern is inputted, further comprising reading the content displayed in the selected area and displaying the content displayed in the selected area in a list form.

18. The method of claim 10, further comprising separately storing in a storage unit an original file of the displayed content and a user input pattern file of the content displayed in the selected area.

* * * * *